United States Patent [19]

Burri

[11] Patent Number: 5,508,651

[45] Date of Patent: Apr. 16, 1996

[54] SENSOR SIGNAL CONDITIONING CIRCUIT

[75] Inventor: Michel Burri, Gd-Saconnex, Switzerland

[73] Assignee: Motorola, Inc., Schaumburg, Ill.

[21] Appl. No.: 312,170

[22] Filed: Sep. 26, 1994

Related U.S. Application Data

[63] Continuation of Ser. No. 901,301, Jun. 19, 1992, abandoned.

[30] Foreign Application Priority Data

Jul. 3, 1991 [GB] United Kingdom .................. 9114366

[51] Int. Cl.$^6$ .......................... H03K 17/14; H01L 35/00; H01L 25/00; H01J 19/82
[52] U.S. Cl. .................... 327/378; 327/379; 327/512; 327/530; 327/532; 327/535; 327/538; 327/565; 307/10.1
[58] Field of Search .................... 307/308, 309, 307/310, 311, 303, 303.1, 10.1; 328/1, 2, 3, 4, 5, 6; 318/701; 341/141; 123/179 B; 327/378, 379, 512, 530, 532, 535, 538, 565

[56] References Cited

U.S. PATENT DOCUMENTS 4,374,333   2/1983   Avery ........................ 307/309
4,896,089   1/1990   Kliman et al. .................. 318/701
4,965,577  10/1990   Baba ........................... 341/141
5,024,186   6/1991   Long et al. .................. 123/179 B

FOREIGN PATENT DOCUMENTS 1109434   4/1968   United Kingdom .

Primary Examiner—David C. Nelms
Assistant Examiner—Trong Phan
Attorney, Agent, or Firm—Rennie William Dover; Harry A. Wolin

[57] ABSTRACT

An automotive sensor arrangement including an automotive sensor coupled via first and second wires to signal sensor evaluation means, a signal conditioning circuit comprising a first gate means connected to provide a bias operating voltage signal on said first wire to the sensor, a second gate means of similar construction to the first gate means and mounted in the same environment and first gate means, the second gate means being coupled to the second wire of the leas means for receive the voltage signal bears a predetermined relationship to the switching point voltage of the second gate means.

9 Claims, 2 Drawing Sheets

MCU ANALOG SIGNAL CONDITIONER

MCU ANALOG SIGNAL CONDITIONER

TRANSFER CURVE VERSUS VOLTAGE SUPPLY

CMOS INVERTER FUNCTION TRANSFER

TRANSFER CURVE VERSUS TEMPERATURE

SENSOR SIGNAL CONDITIONING CIRCUIT

This application is a continuation of prior application Ser. No. 07/901,301, filed Jun. 19, 1992, now abandoned.

FIELD OF THE INVENTION

This invention relates to a signal conditioning circuit for the output signal of a sensor for automotive or industrial purposes, particularly though not exclusively an inductive tachogenerator, prior to evaluation of the sensor output signal.

BACKGROUND ART

A prior proposal in an automotive application is shown in FIG. 1 for coupling and conditioning a signal from an inductive tachogenerator sensor 2 to a microcomputer unit (MCU) 4 which evaluates the sensor signal. A resistor network 6 coupled to a bias voltage supply V provides a bias point of V/2 for the tachogenerator. Network 6 together with capacitors 8 provide a low pass filter for filtering and attenuating the voltage output signal of the sensor 2, the voltage output signal varying between a few mV and several hundred volts. The sensor 2 is coupled via a twisted wire pair 10 to MCU 4, MCU 4 containing matched resistors 12, buffers 14 and a voltage comparator 16. Matched resistors 12 are provided for ensuring there is no voltage offset between the two inputs, but it is difficult to ensure matching of the resistors 12 both in terms of their relative values and their absolute values relative to resistor network 6. In addition there is the problem that the temperature of the tachogenerator 2 and nearby circuitry may be at a different temperature from MCU 4 which may create further inaccuracies.

SUMMARY OF THE INVENTION

It is an object of the invention to provide a simple and reliable signal conditioning circuit for an automotive sensor which overcomes or at least reduces the problems of the prior art.

The present invention provides an automotive sensor arrangement including an automotive sensor coupled via first and second wires to signal sensor evaluation means, a signal conditioning circuit means comprising a first gate means connected to provide a bias operating voltage signal on said first wire to the sensor, a second gate means of similar construction to the first gate means mounted and in the same environment as the first gate means, the second gate means being coupled to the second wire of the lead means to receive the output signal from the sensor, such that the bias operating voltage signal bears a predetermined relationship to the switching point voltage of the second gate means.

As preferred the first and second gate means together with the evaluation means form part of a single integrated circuit, for example a microcomputer unit (MCU) or other processor chip.

A specific advantage of the invention arises when the gates are formed on a processor chip since such chips are inherently designed in terms of logical gates as opposed to analog components (such as matched resistors) and therefore the characteristics of the gate are well understood and adapted to the other parts of the circuit.

As preferred the first gate is configured to provide a voltage level of about half the supply voltage by means of a resistive feedback connection between the output port and the input port. Such voltage level is at about the midpoint of the switching characteristic of the second gate.

As preferred the first and second gates are single transistors based on the well known CMOS or HCMOS technology which has a transfer function of the logical gate switching point of about half of the voltage supply. The slope of the transfer function gives the open-loop voltage gain of the inverter which is about 30 dB. Using this property, it's possible to make an analog amplifier with a HCMOS inverter transistor knowing the 180° phase difference between its input and its output. The connection of the output of the inverter to its input creates a closed-loop amplifier having a working point at the middle of the transfer function which is near the half the voltage supply.

An important property is that HCMOS gates on the same chip have the same DC voltage value of the transfer function. The gate inverter that is configured in an analog amplifier produces a DC voltage value that is identical as the voltage level of the transfer function of gate configured as a detector. This technique permits matching automatically the DC offset voltages. The DC voltage value of the transfer function is ratiometric with the voltage supply (VDD) and the drift voltage of the transfer function versus temperature of the gate inverters on the chip varying in the same direction. This technique avoids the need for matched resistances and operational comparator which require more silicon space.

BRIEF DESCRIPTION OF THE DRAWINGS

A preferred embodiment of the invention will now be described with reference to the accompanying drawings in which.

DESCRIPTION OF THE PREFERRED EMBODIMENT

Figure 1:
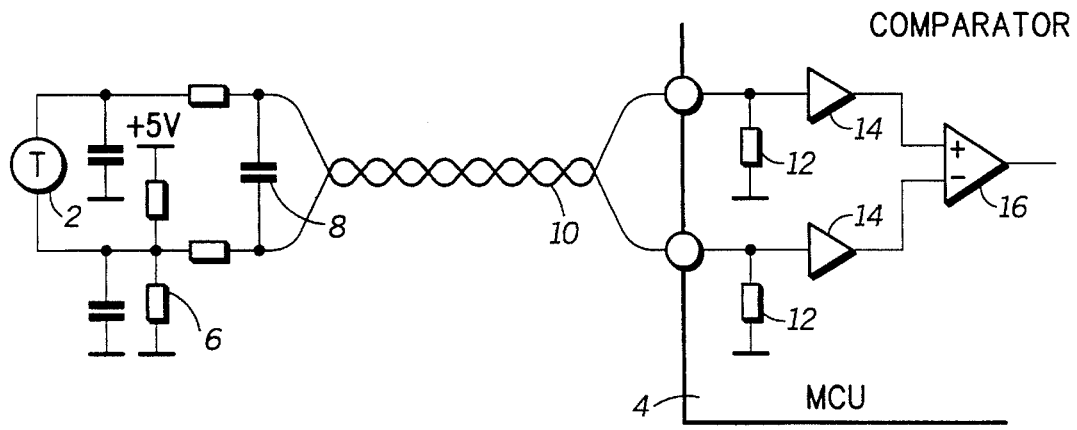
FIG. 1 is a circuit diagram of a known signal conditioning arrangement for a tachogenerator in an automotive application.
Figure 2:
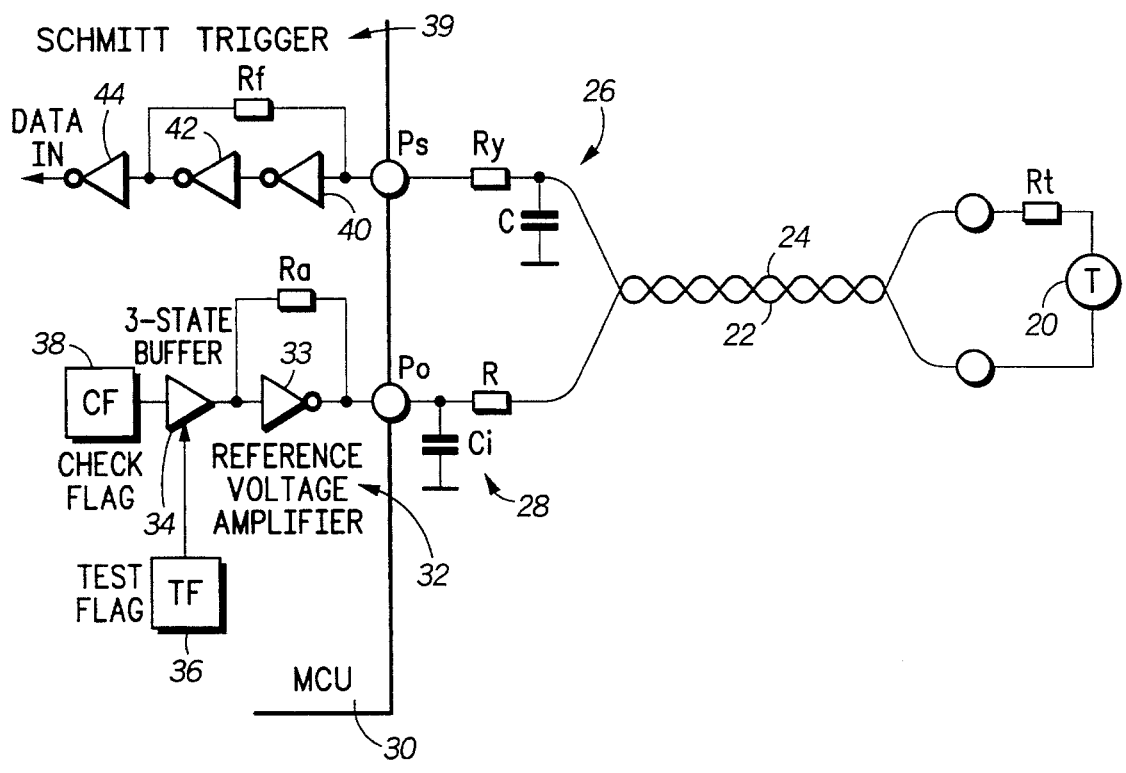
FIG. 2 is a circuit diagram of a preferred embodiment of a signal conditioning circuit according to the invention, for an automotive application.
Figure 3:
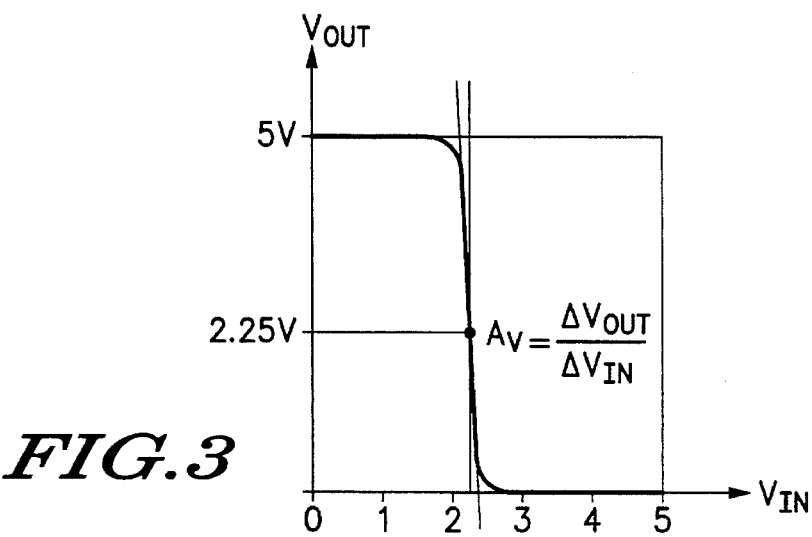
FIGS. 3 to 5 are graphs of transfer functions of the inverting gate employed in the present invention.

Referring now to FIG. 2 which shows a signal conditioning circuit for an automotive application in accordance with the invention, a tachogenerator 20 having an internal resistance $R_t$ coupled via a twisted wire pair comprising first and second wires 22, 24 and via low pass filters 26, 28 comprising resistors $R_y$, C and R $C_t$, respectively, to the respective ports $P_S$, $P_O$ of a microcomputer unit 30. MCU unit includes a reference voltage amplifier 32 comprising an inverting HCMOS transistor gate 33 which is coupled in a resistive feedback loop having a resistance $R_a$. Such an arrangement provides an output voltage at a level of ½ of the voltage supplied to the gate. Thus, referring to FIG. 3, this shows that the resistive feedback loop coupled to an inverting gate will provide an output voltage at a point midway between the two switching states of the gate i.e. at about half the supply voltage. The reference voltage amplifier is controlled by a 3 state buffer, 34 which is coupled to a test flag means 36 and a check flag means 38 for control of the amplifier 32. The first wire 22 of the twisted wire pair is coupled to input port $P_S$ and then to a Schmitt Trigger 39 comprising inverting gates 40, 42 having a resistive feedback loop $R_f$ and then to a detection gate 44 comprising an inverting gate of similar construction to the gate 33.

In use, the output of the Reference Voltage Amplifier 32 produces the DC operating voltage necessary for the Tachogenerator and the Schmitt Trigger through the wires and the Tacho unit.

The resistances R and $R_y$ serve different functions:

1) The value of the resistance R in conjunction with the value of the capacitor C make a $R_c$ filter of 6 dB per octave used in this kind of application knowing that the tacho unit generates an output voltage proportional to its speed of revolution.

2) The values of the resistances R and $R_y$ protect the MCU against high transient voltage or electrostatic voltage discharge by limiting of the current flowing through the ports $P_o$ and $P_s$.

3) The added value of the resistances R and $R_y$ is introduced in the calculation of the voltage hysteresis with the internal resistance $R_f$.

$$V_{hys} = V_{DD} \frac{R + R_y}{R + R_y + R_f}$$

The capacitor $C_i$ may be used to protect the MCU against electromagnetic noise captured by the wire connection of the tacho unit.

A 3-state buffer 34 is employed to check if the wires are not short circuited to the ground or to the voltage supply. Setting the flag TF, the 3-state buffer is turned on which forces the output of the reference voltage amplifier to the one (+V) or to the zero (0 V) logical state level depending of the logical level of the flag CF. By monitoring the logical level received at the output of the Schmitt Trigger (DATA IN) MCU knows if the wires are in good condition or not.

Figure 4:
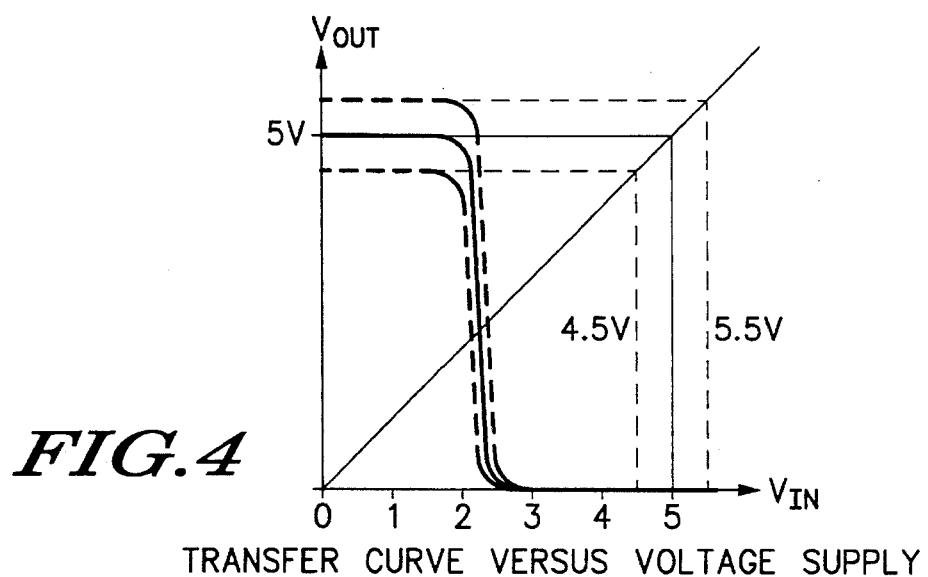
Figure 5:
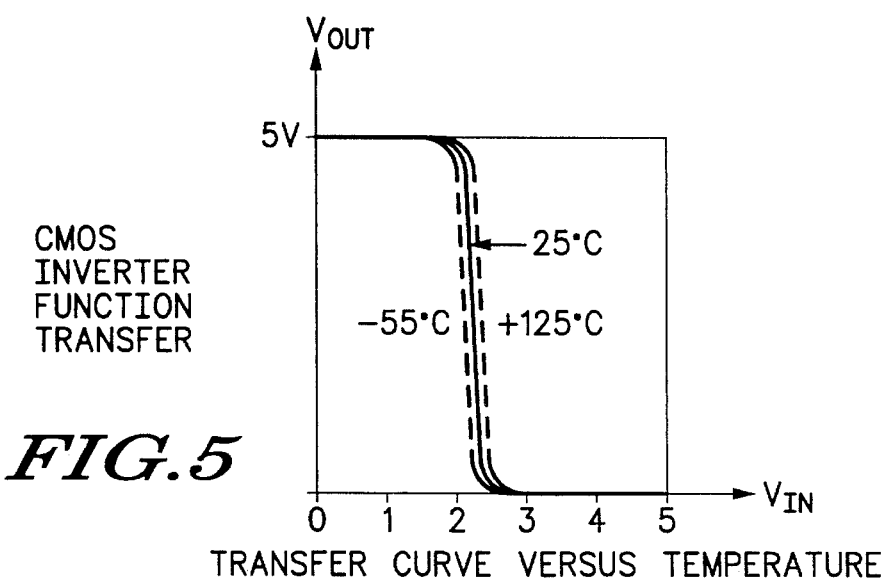

FIG. 4 shows the switching characteristics of the gate as a function of voltage supply, and FIG. 5 shows the transfer function of the gate as a function of temperature. These figures indicate that the operation of the circuit is relatively independent of supply voltage and temperature.

I claim:

1. An automotive sensor arrangement including an automotive sensor for providing an output signal and coupled via first and second wires to a signal conditioning circuit comprising a reference voltage means including a first gate means connected to the first wire to provide a bias operating voltage through said first wire to the sensor, a signal detector including a second gate means of similar construction to the first gate means and mounted in the same environment as the first gate means, the second gate means being coupled to the second wire to receive the output signal from the sensor, the bias operating voltage being coupled to the second wire through the sensor and through the second wire to the signal detector.

2. A sensor arrangement as claimed in claim 1 wherein the first and second gate means are formed in a common integrated circuit.

3. A sensor arrangement as claimed in claim 1 wherein the first gate means has a resistive feedback connection between its input and output to provide a D.C. output voltage intermediate of voltage output levels of the switched conditions of the gate.

4. A sensor arrangement as claimed in claim 1 including a Schmitt trigger means coupled between the second wire and the second gate means.

5. A sensor arrangement as claimed in claim 1 including processor flag means for initiating operation of the first gate means.

6. A sensor arrangement as claimed in claim 1 including first and second R.C. low pass filters connected in said first and second wires, respectively.

7. A sensor arrangement as claimed in claim 1, wherein the first and second wires comprise a twisted wire pair.

8. A sensor arrangement as claimed in claim 1, wherein the automotive sensor comprises a tachogenerator.

9. A sensor arrangement as claimed in claim 1, further including a 3-state buffer coupled to the first gate means.

\* \* \* \* \*